(12) United States Patent
Dang

(10) Patent No.: US 6,529,329 B2
(45) Date of Patent: Mar. 4, 2003

(54) OPTICAL ALIGNMENT APPARATUS WITH A BEAM SPLITTER

(75) Inventor: Lieu-Kim Dang, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/941,116

(22) Filed: Aug. 28, 2001

(65) Prior Publication Data

US 2002/0085611 A1 Jul. 4, 2002

(30) Foreign Application Priority Data

Nov. 8, 2000 (DE) .......................................... 100 55 161

(51) Int. Cl.[7] ........................... G02B 27/10; G02B 27/30
(52) U.S. Cl. ....................................... 359/618; 359/641
(58) Field of Search ................................ 359/618, 641, 359/822

(56) References Cited

U.S. PATENT DOCUMENTS

| | | | | |
|---|---|---|---|---|
| 4,117,319 A | * | 9/1978 | White, III | ................. 250/201.1 |
| 5,341,246 A | * | 8/1994 | Oono et al. | ................... 359/209 |
| 5,617,202 A | * | 4/1997 | Rando | .......................... 33/286 |
| 6,118,471 A | * | 9/2000 | Sumi | ........................... 347/244 |

* cited by examiner

*Primary Examiner*—Ricky Mack
(74) *Attorney, Agent, or Firm*—Sidley Austin Brown & Wood, LLP

(57) ABSTRACT

An optical alignment apparatus including a beam splitter (2) for diverging a primary laser beam (4) emitted by a radiation source (5) into a plurality of divergent beam portions (3a, 3b, 3c, 3d, 3e), and elements for minimizing the angle error of the divergent beam portions (3a, 3b, 3c, 3d, 3e) and including a collimator (6) located between the radiation source (5) and the beam splitter (2), and a spacially oscillatingly adjustable, transparent, plane-parallel plate (7) arranged in a path of the primary laser beam (4).

6 Claims, 1 Drawing Sheet

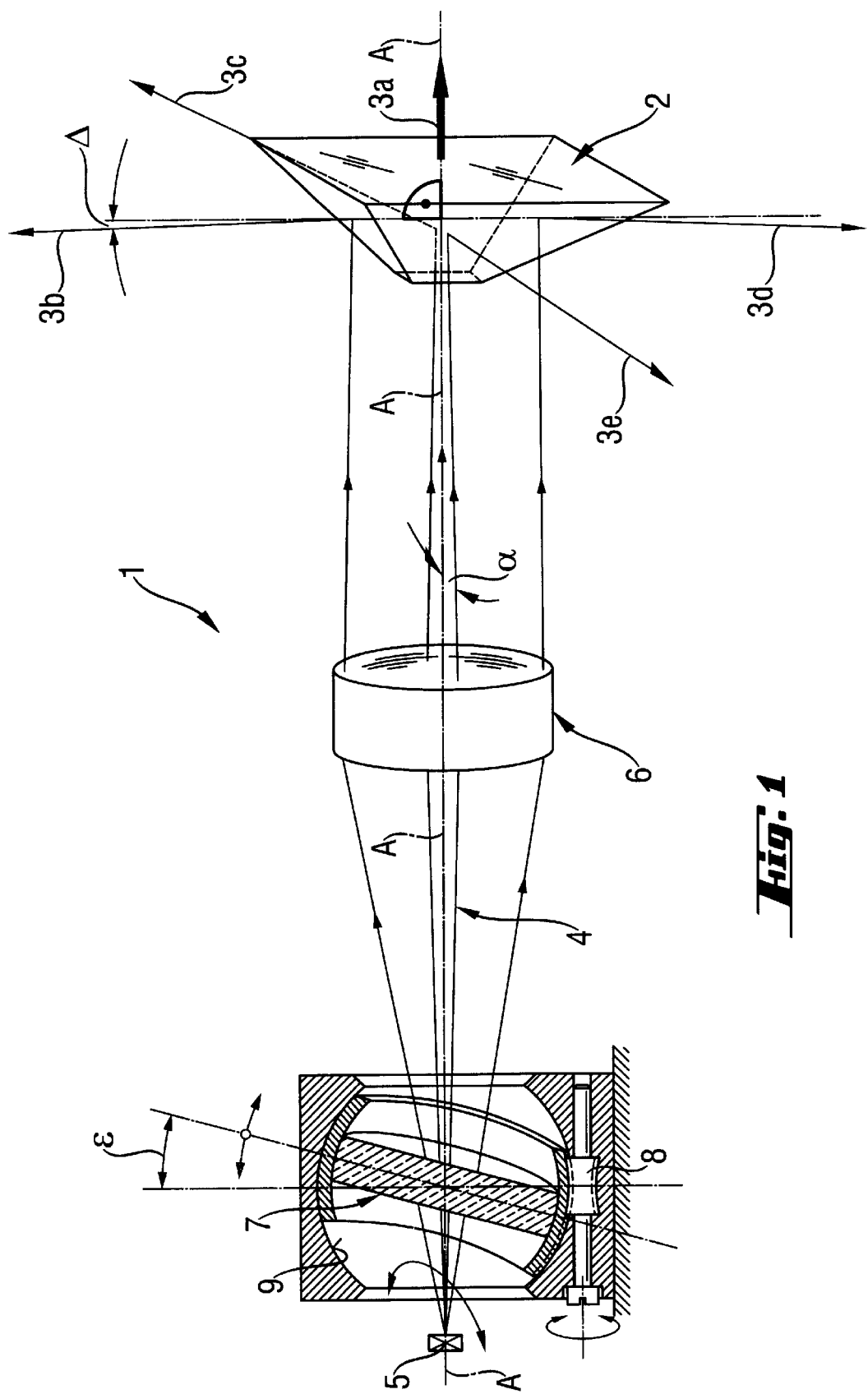

OPTICAL ALIGNMENT APPARATUS WITH A BEAM SPLITTER

BACKGROUND OF THE INVENTION

1. Field of the Invention

The present invention relates to a multiple-beam optical alignment apparatus, e.g., a three-axes laser apparatus used in the constructional industry and including means for minimizing an angle error of diverged, by a beam splitter, beam portions of a primary laser beam

2. Description of the Prior Art

Conventionally, for splitting a primary laser beam into a plurality of divergent beam portions extending at a right angle to each other, a beam splitter and a plurality of mirrors are used. With this arrangement, each separate mirror and the beam splitter should be precisely adjusted and secured in order to achieve the necessary precision of the alignment of the beam portions with respect to each other. In the newest apparatuses, a single beam-splitting prism is used instead of mirrors. The beam-splitting prism, which is produced with a very high precision with respect to the solid angle between the active surfaces, is adjusted, secured, and fixed in a free space or in a housing with only a small tolerated angular deviation. The beam-splitting prism is generally secured with glue. Such alignment apparatuses have a low mechanical stability against thermal or shock-like loads which are usually encountered in a constructional industry.

U.S. Pat. No. 5,617,202 discloses a multiple-beam laser apparatus in which a beam-splitting prism is used for producing two beams at a right angle to each other. To provide for a lateral deviation of secondary beams of a primary laser beam, there are arranged, on a single active surface of the beam splitter, plane-parallel transparent plates which are located in parallel beam paths between a collimator and the beam splitter.

U.S. Pat. No 5,321,717 discloses the use of special prism combinations for focusing of laser beams which also provide for a lateral displacement of the beams.

U.S. Pat. No. 5,341,246 discloses the use of rotatably adjustable, plane-parallel transparent plates for a lateral deflection of laser beams which are directed to prisms.

U.S. Pat. No. 6,118,471 discloses an arrangement of perpendicularly oriented plane-parallel transparent plates in sections of a divergent beam path for producing a phase difference within the beam path.

An object of the present invention is to provide a simple and mechanically stable alignment apparatus in which an angle error of divergent beam portions of a primary beam, which are deflected by a beam splitter, is minimized.

SUMMARY OF THE INVENTION

This and other objects of the present invention, which will become apparent hereinafter, are achieved by providing an alignment apparatus including a radiation source for emitting a primary laser beam, a beam splitter for diverging the primary laser beam into a plurality of divergent beam portions and means for minimizing the angle error of the divergent beam portions and including a collimator located between the radiation source and the beam splitter for focusing the beam portions and directed them to the beam splitter, and spacially oscillatingly adjustable, transparent, plane-parallel plate arranged in a path of the primary laser beam. The spatially pivoting, transparent plane-parallel plate causes a lateral parallel shifting of the beam which, in combination with the located downstream collimator, leads to the angular offset.

The magnitude of the deflection angle depends on the thickness D and refractive index n of the plane-parallel plate, on focus f of the collimator lens, and the plate inclination angle $\epsilon$. The deviation angle $\alpha$ is determined from the following equation:

$$\alpha = \frac{(n-1)D \cdot \varepsilon}{nf}$$

Because the lateral parallel adjustable beam is diverged behind the collimator, by an adjusting angle at which it is directed to the beam splitter which splits in different beam portions, e.g., in a reflected beam portion and a transmitted beam portion, an adjustment of angular positions between the beam portions becomes possible as a result of doubling of the adjusting angle with respect to the parallel to the adjusting angle, transmittation which takes place upon reflection.

The adjustment of a spacial inclination angle of the transparent plane-parallel plate, because of a resulting small deviation of the primary laser beam, can be effected rather easily. The fixed adjusted position of the plate remains mechanically stable under the action of temperature and shock loads.

The inclined transparent plane-parallel plate introduces into the beam path astigmatism and coma which can lead to deterioration of the wave front aberration of the laser beam. Therefore, the upper limit of the adjusting angle depends on what collimator lens, numerical aperture of the beam portion, and, finally, what optical quality of the ejected beam are required. However, particular in the constructional industry, the advantage of the mechanical stability is preponderant.

Advantageously, the position of the transparent plane-parallel plate with respect to the collimation unit, which is formed of the radiation source and the collimator, is fixed, after the adjustment, with glue that connects the adjacent surface regions.

Advantageously, the beam splitter is formed as a beam-splitting prism formed with a very high precision of the solid angle between the active surfaces. This permits to eliminate separate components and adjusting steps associated with orientations of beam portions.

Advantageously, the transparent plan-parallel plate is made spacially rotatably oscillatingly adjustable. As a result, with the coaxial rotation, with respect to the primary laser beam, of the plate, the degree of freedom of the adjustment remains constant, which facilitates the adjustment.

Advantageously, the transparent plan-parallel plate is fixedly received in a spherical cap which, after adjustment, is fixed with glue with respect to the collimating unit.

Alternatively, the edge of the transparent plane-parallel plate can be formed as a spherical edge fixed with glue in a seat of a calotte shell.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiment, when read with reference to the accompanying drawings.

BRIEF DESCRIPTION OF THE DRAWINGS:

Single FIGURE of the drawings shows a schematic view of an alignment apparatus according to the present invention.

DETAILED DESCRIPTION OF THE PREFERRED EMBODIMENT

In alignment apparatus 1 according to the present there is provided means designed for minimizing an angle error $\Delta$ of five beam portions 3a, 3b, 3c, 3d, and 3e of a primary laser beam 4 which are deflected by a beam splitter 2 and diverge from each other by a right angle. The primary laser beam 4 is emitted by a punctiform radiation source 5 which is formed as a semiconductor diode laser. The beam splitter 2 is formed as a beam-splitting prism. A collimator 6 focuses the beam portions and directs them parallel to each other toward the beam splitter 2. A transparent plane-parallel plate 7 is arranged in the path of the primary beam 4. The plate 7 is adjustably oscillatingly supported in a spherical cup 9, having its angular position adjusted by adjusting screws which form adjusting means 8. By pivoting the plane-parallel plate 7 about a large inclination $\epsilon$, a very small deflection angle a with respect to the optical axis A can be adjusted with a conventional arrangement of a three-axis laser with $\pi=1.515$ D=3 mm; f=27 mm; and $\epsilon=0.122$ rad (~7°), a deflection angle $\alpha$ of 21 angular minutes can be obtained, with a transfer function amounting to 0.05. The unchanged, due to the parallelism of the surfaces of the beam-splitting prism which forms the beam splitter 2, beam portion 3a, is transmitted through beam-splitting prism in the propagation direction, is deflected, with respect to the reflected beam portions 3b, 3d, by a double deflection angle $\alpha$ whereby the angle error $\Delta$ is corrected. The same is valid for inclination for the plane-parallel plate 7 with respect to an axis extending perpendicular to the optical axis A and lying in the plane of the drawings.

Though the present invention was shown and described with references to the preferred embodiment, such are merely illustrative of the present invention and are not to be construed as a limitation thereof, and various modifications of the present invention will be apparent to those skilled in the art. It is, therefore, not intended that the present invention be limited to the disclosed embodiment or details thereof, and the present invention includes all variations and/or alternative embodiment within the spirit and scope of the present invention as defined by the appended claims.

What is claimed is:

1. An optical alignment apparatus, comprising a radiation source (5) for emitting a primary laser beam (4); a beam splitter (2) for diverging the primary laser beam (4) into a plurality of divergent beam portions (3a, 3b, 3c, 3d, 3e); and means for minimizing an angle error of the divergent beam portions (3a, 3b, 3c, 3d, 3e) and including a collimator (6) located between the radiation source (5) and the beam splitter (2) for focusing the beam portions and directed them to the beam splitter (2), and spatially rotatably adjustable, transparent, plane-parallel plate (7) arranged in a path of the primary laser beam (4).

2. An apparatus according to claim 1, wherein the radiation source (5) and the collimator (6) form a collimation unit, with adjacent surface regions of the plane-parallel plate (7) being glued, after completion of the adjustment, to respective surfaces of the collimation unit.

3. An apparatus according to claim 1, wherein the beam splitter (2) is formed as a beam-splitting prism.

4. An apparatus according to claim 1, wherein the plane-parallel plate (7) has a spherical edge.

5. An apparatus according to claim 1 further comprising means (8) for adjusting a position of the plane-parallel plate (7).

6. An apparatus according to claim 1, further comprising a spherical cap (9) for receiving the plane-parallel plate (7).

* * * * *